G. E. ROESCH & F. F. WRIGHT.
METAL SHEARING MACHINE.
APPLICATION FILED JULY 20, 1908.

931,220.

Patented Aug. 17, 1909.
2 SHEETS—SHEET 1.

WITNESSES:
Mathew J. Marty
C. F. Barrett

INVENTORS
George E. Roesch
Frank F. Wright
BY Frederick Benjamin
ATT'Y.

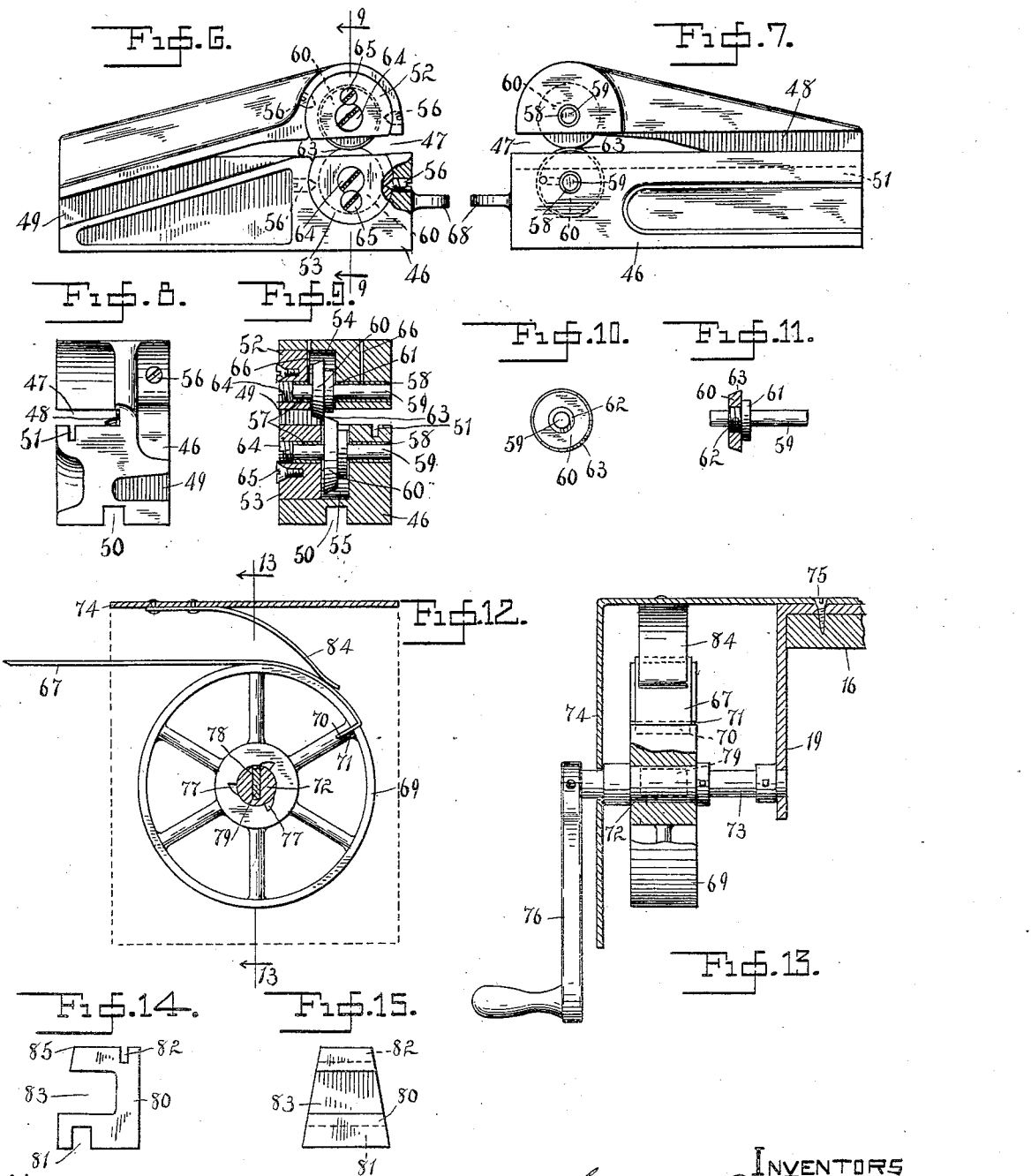

UNITED STATES PATENT OFFICE.

GEORGE E. ROESCH AND FRANK F. WRIGHT, OF AURORA, ILLINOIS.

METAL-SHEARING MACHINE.

No. 931,220.  Specification of Letters Patent.  Patented Aug. 17, 1909.

Application filed July 20, 1908. Serial No. 444,360.

*To all whom it may concern:*

Be it known that we, GEORGE E. ROESCH and FRANK F. WRIGHT, citizens of the United States, residing at Aurora, in the county of Kane and State of Illinois, have invented certain new and useful Improvements in Metal-Shearing Machines, of which the following is a specification.

Our invention relates to sheet-metal shearing or cutting appliances.

The chief objects of the improvements which form the subject matter of this application are:—to provide a sheet-metal shearing apparatus that will cut the material with rapidity, with minimum power to operate and that will be accurate in its results.

Further objects are:—to provide an accurate cutting mechanism adapted to sheets of any width and varying thickness; to simplify the carriage part of the machine; to furnish a rapid and easily operated hand-power means for propelling the cutter carriage; and to produce a simple apparatus for the purpose stated, that will be durable and, having few parts, can be produced at a comparatively small cost.

We accomplish the desired results by employing the apparatus illustrated in the accompanying drawings, forming a part of this application, the appliance comprising, in general, a supporting table, a trussed clamp, a gage, a shearing mechanism mounted in a carriage, a track therefor and propelling means for the carriage.

The construction of a machine embodying our improvements is shown in detail in the following views:—

Figure 1:
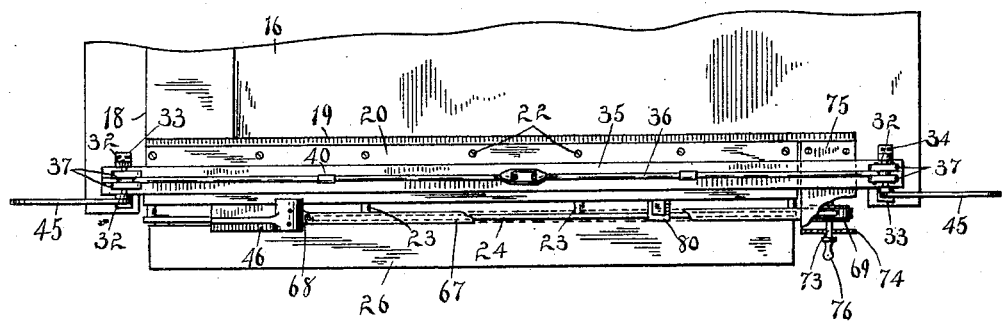
Figure 2:
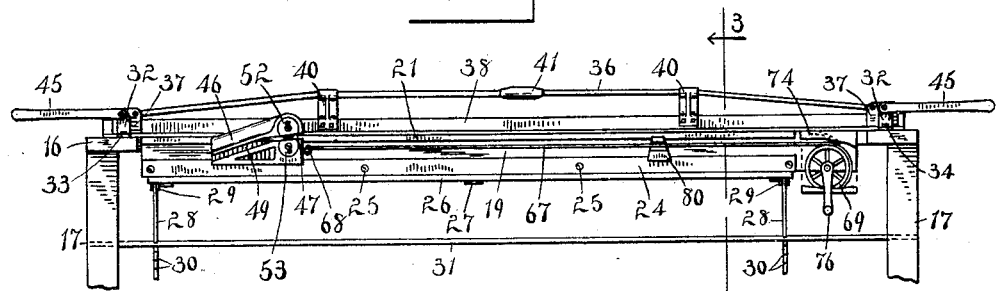
Figure 3:
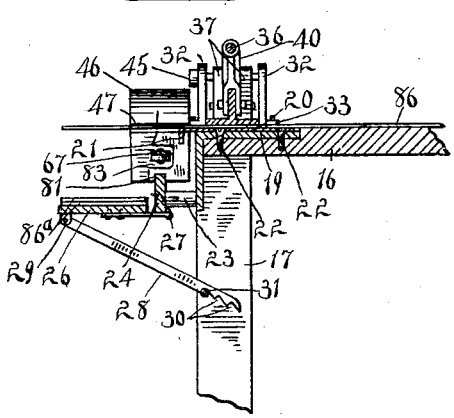
Figure 4:
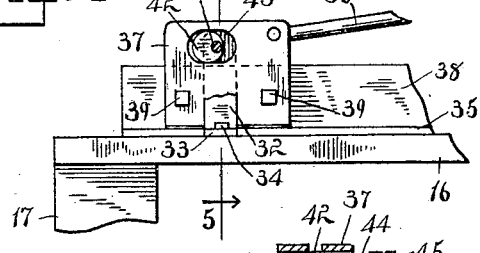
Figure 5:
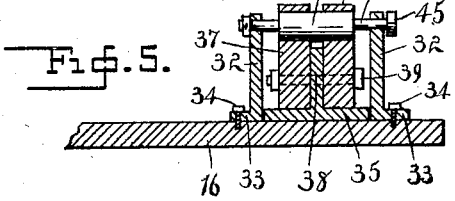

Figure 1 is a top plan view of our improved sheet-metal shearing device, a portion of the table being broken away; Fig. 2 is a front elevation, showing only a portion of the table supports; Fig. 3 is an enlarged sectional view on the line 3—3 of Fig. 2; Fig. 4 is an enlarged fragmentary view taken from Fig. 2; Fig. 5 is a sectional view on the line 5—5 of Fig. 4; Figs. 6 and 7 are side elevations and Fig. 8 an end view of the shear carriage; Fig. 9 is a section on the line 9—9 of Fig. 6; Figs. 10 and 11 are, respectively, end and side views of one of the shearing elements; Fig. 12 is a side elevation of the band wheel, with the shaft in section; Fig. 13 is a sectional view on the line 13—13 of Fig. 12, and Figs. 14 and 15 are end and side elevations, respectively, of the gage.

Referring to the details of the drawings the numeral 16 indicates a bed or table, supported by legs 17, and furnished with the usual straight edge or guide 18. The working edge of the table is protected by a steel angle plate 19, and upon this plate lies a face plate 20, projecting beyond the margin of the angle plate and having a depending guide flange 21, upon the extreme edge. The angle and face plates are let into the table 16 so as to be flush with the surfaces which they parallel, and are secured by suitable screws 22. Along the lower edge of the depending flange of the angle plate are fixed horizontal lugs 23 which support a vertical rail 24 formed of a flat bar placed on edge and secured by screws 25, which enter the ends of the lugs 23. This rail extends the length of the table and to its lower edge, a shelf 26, coextensive in length with the rail, is attached by hinges 27, its outer edge being supported when the shelf is in a horizontal position by braces 28, pivoted to said shelf at 29, and provided with notches 30 near their lower end to engage a transverse rod 31, connecting the legs 17 of the main table. The shelf can thus be dropped to a vertical position when not in use, by disengaging the braces from the said rod. At the opposite ends of the angle-plate 19, are fixed guide posts 32, arranged in pairs and provided with foot flanges 33, through which pass securing screws or bolts 34. Between these posts is arranged a clamp bar 35, formed of a T-iron placed in an inverted position, and strengthened by a tension rod 36, secured at each end to bearing plates 37, fastened to opposite sides of the vertical flange 38, of the bar 35, by bolts 39. The said rod is supported between its ends by posts 40, attached to the said flange 38. Provision is made for keeping the frame, or truss, in proper shape by inserting in said rod a turn-buckle 41. The clamp-bar is moved vertically between its guide posts 32 by means of cams 42, engaging slots 43 in the bearing plates 37, said cams consisting of rollers eccentrically mounted on shafts 44 journaled in the tops of the guide posts 32, an operating lever 45 being attached to each shaft.

The shearing mechanism is carried by an oblong block 46, cast in a single piece. The front end is provided with a horizontal slot 47 designated the throat. Continuous with this throat in the inner side is a horizontal groove 48, while in the outer side of the block or carriage, is a downwardly inclined groove 49, also continuous with the throat 47. In the under side of the block in the median line is a longitudinal channel or groove 50 to receive the rail or track 24, which slidably supports the block and in the bottom of the transverse groove 48 is a narrower channel or groove 51, to receive the depending flange 21, which coöperates with the rail to form a way to guide and support the shear-carriage or block. Above and below the throat 47, upon its outer face, the block is counterbored transversely to approximately half its depth, the lower counterbore extending farther through the block than the upper one. Into these counterbores are inserted bushings 52, 53, which extend part way to the bottom of their respective bores, leaving recesses 54, 55, in which are located the cutting elements hereinafter described. The said bushings fit snugly in their seats and are removably secured therein by pointed screws 56 the outer faces of the bushings being flush with the surface of the block. These bushings have holes bored through their centers, in which are fitted sleeves 57, and holes in alinement therewith are formed in the walls of the block, and sleeves 58 driven therein. The said sleeves form bearings for spindles 59 upon which are mounted hardened steel shearing disks 60. Each spindle is provided with an integral collar 61 having a threaded reduced portion 62 forming a shoulder, and upon this reduction upon each spindle is screwed one of the hardened cutters 60. The face of each cutter is beveled to form a cutting edge 63, and the cutters are relatively reversed on their respective spindles, and slightly overlap as shown in Fig. 9, thus coöperating to form effective shearing means. When the cutters are assembled as shown, the sleeves 57 are retained by screws 64 which engage internal threads in the central holes of the bushings, and these screws in turn are secured by lock screws 65, having flat heads which engage suitable notches in the screws 64. Those portions of the bushings 52, 53, which would project into the throat 47 if they were cylindrical, are removed, so that the only members extending into the throat are the rotary cutters 60. Wherever the housing formed by the block 46 prevents convenient access to the bearings oil holes 66 are provided to facilitate lubrication.

The block or carriage 46 is propelled during the process of shearing by being drawn along upon its slide way, by means of a flexible metal band 67, secured at one end to an eye 68 on said carriage, and at the other, engaging the periphery of a driving pulley 69, its extremity 70 being fastened thereto by being inserted into a slot 71. The driving pulley is loosely mounted upon a collar 72 fixed on a shaft 73, journaled at one end in the angle-plate 19, and at the other passing through the depending portion of an angled bracket plate or housing 74 attached to the surface of the main table at 75, thus forming a cover over the said pulley. Upon the outer end of the shaft is mounted an operating crank 76. The inner surface of the hub of the pulley is provided with spaced notches 77 forming an internal ratchet, and the collar 72 is provided with a socket 78 in which is loosely mounted a gravity controlled pawl in the form of a rectangular plate 79. When the shaft 73 is rotated in one direction by the crank 76, the pawl 79 will drop by gravity and engage the ratchet 77 and turn the pulley therewith, and so long as there is a certain amount of tension upon the band 67 as during the operation of shearing the friction will be sufficient to maintain the pawl in engagement with the ratchet. As soon as the tension is relieved by the completion of the cutting action, the pawl will be free to be acted upon by gravity, and when the shaft is in position shown in Fig. 12, the pawl will drop back into its socket, releasing the pulley, and permitting the carriage to be retracted to its initial position without affecting the shaft, so long as the latter remains with the socket uppermost.

Since the shearing disks are covered by the upper portion of the block and therefore not readily seen, it is necessary to make some provision for setting the sheet to be cut in proper relation to the line of cut and this is done by means of a gage block 80, which has grooves 81, 82, upon its lower and upper sides respectively, to accommodate the rail 24 and guide flange 21, upon which it slides independently of the carriage 46, and in its outer side is provided with a mouth 83, to permit the gage to clear the band 67, as shown in Fig. 3.

During the shearing operation the band will be under a high degree of tension and when the carriage is released at the end of the cut, the said band may be thrown off from the pulley face, which would be likely to result in entangling the coils and kinking the band at its attachment to the pulley. As a precautionary measure to prevent such a result, a frictional contact spring 84 is secured to the under side of the housing plate 74 and its free end rests upon the band over the pulley, as shown with sufficient force in Fig. 12 preventing it from becoming displaced.

The operation of the machine thus described in detail is very simple and will be readily understood by any one skilled in the art to which this invention appertains. The parts having been assembled as shown in the drawings and the carriage 46 drawn to the extreme limit of its travel away from the operating pulley, the sheet 86 (Fig. 3) is inserted beneath the clamp-bar in the usual manner and carried forward until it lies in the proper position to receive the shear, which is readily determined by sliding the gage block 80 up to the sheet. The line of the front angle 85 of said block coincides with the shearing line, and when the indicating scribe mark upon the sheet alines therewith, the sheet is firmly clamped by the bar 35 through the levers 45. The operator then draws the shearing member or carriage across the sheet by means of the crank 76 wheel 69 and band 67. The severed portion 86ª of the sheet is engaged and deflected by the inclined groove 49, and falls upon the shelf 26, while the margin of the main sheet passes through the horizontal groove 48. When the end of the cut is reached the operator releases the crank which immediately drops to a vertical position from its weight, the pawl 79 recedes into its socket, and the operator replaces the carriage at its initial position. He then releases the clamp bar, advances the sheet for another cut, determining its position as before by means of the gage 80, and then clamping it in position for another cut. It will be readily understood that the gage will be pushed ahead of the carriage, if left within the limit of its travel, for each particular cut.

Having thus described our invention, what we claim as new, is:—

1. In a cutting apparatus of the class described, the combination with a suitable support having a guide-rail and a clamp, of a carriage mounted on said guide-rail and consisting of an upper and a lower portion with an inclined face between said portions, cutters rotatably and adjustably mounted in the respective portions of said carriage and means for moving said carriage along said guide-rail.

2. In a cutting apparatus of the class described, the combination with a suitable support having a guide-rail and a clamping-bar, of a carriage slidably mounted on said guide-rail, said carriage having a throat and a downwardly and rearwardly inclined face, cutters rotatably mounted to project into the said throat, and means for operating said carriage.

3. In a cutting apparatus of the class described, the combination with a suitable support having a guide-rail and clamping means, of a carriage slidably mounted on said guide-rail, said carriage having a guide opening and way for the material to be cut, coöperating cutting devices arranged on said carriage and adjustable relative to each other, and means for operating said carriage.

4. In a cutting apparatus of the class described, a carriage, cutting devices adjustably mounted on said carriage, said carriage adapted to guide the material to be cut between said cutting devices and to deflect the severed portion from the body of the material, means for holding the material to be cut, and means for operating said carriage.

5. In a cutting apparatus, a cutting member comprising a block having a throat and guide-way for the material to be cut, cutting devices projecting into said throat, means for guiding and supporting said block, and means for operating said block.

6. In a shearing apparatus, the combination with a suitable support, a clamp, and a guide-way, of a carriage slidable on said guide-way, said carriage comprising a block having a throat connecting with a horizontal groove upon one side and a downwardly extending groove upon the opposite side and having two cavities arranged upon opposite sides of said throat, bushings in said cavities, a pair of coacting rotatable cutters arranged in said cavities, and means for propelling said carriage along its guide-way.

7. In a shearing apparatus, the combination with a suitable support, a clamp, a guide-way, and a carriage slidable on said guide-way, of rotatable shearing elements mounted in said carriage, each of said elements comprising a spindle, a collar on the spindle, and a disk having a threaded engagement with said collar, said disk being provided with a beveled face, and means for drawing said carriage along the guide-way.

8. In a shearing apparatus, the combination with a table, a clamp, a rail attached to the table, a carriage slidable on said rail, cutters rotatably mounted in said carriage, means for sliding said carriage, a gage slidable on the rail, and a shelf adjustably attached to the rail.

9. In a shearing apparatus, a cutting member comprising a block having a throat, an inclined groove and a horizontal groove registering with said throat, and cutting elements projecting into said throat, in combination with means for slidably supporting said member and means for operating said member.

10. In a shearing apparatus, a cutting member comprising a block having a throat, an inclined groove and a horizontal groove registering with said throat, rotatable cutting elements projecting into said throat, means for guiding said block, and means for operating said block, said operating means adapted to be automatically thrown into and out of engagement.

11. In a cutting apparatus of the class described, a support, a clamping device comprising a bar, a truss-rod secured to said bar, and adapted to have its tension adjusted, bearing plates secured to said support, and means coöperating with said plates for raising and lowering said bar.

In testimony whereof we affix our signatures in the presence of two witnesses.

GEORGE E. ROESCH.
FRANK F. WRIGHT.

Witnesses:
A. A. WILMARTH,
ALICE H. WILMARTH.